(12) United States Patent
Jane Santamaria

(10) Patent No.: US 9,321,377 B2
(45) Date of Patent: Apr. 26, 2016

(54) MOTOR VEHICLE CHILD SAFETY SEAT

(71) Applicant: JANE, S.A., Palau de Plegamans, Barcelona (ES)

(72) Inventor: Manuel Jane Santamaria, Palau de Plegamans (ES)

(73) Assignee: JANE, S.A., Palau de Plegamans (ES)

( * ) Notice: Subject to any disclaimer, the term of this patent is extended or adjusted under 35 U.S.C. 154(b) by 0 days.

(21) Appl. No.: 14/469,890

(22) Filed: Aug. 27, 2014

(65) Prior Publication Data
US 2015/0076878 A1  Mar. 19, 2015

(30) Foreign Application Priority Data

Sep. 18, 2013 (ES) .............................. 201331077 U

(51) Int. Cl.
*B60N 2/28* (2006.01)

(52) U.S. Cl.
CPC ............ *B60N 2/2887* (2013.01); *B60N 2/2824* (2013.01); *B60N 2/2851* (2013.01); *B60N 2/2875* (2013.01)

(58) Field of Classification Search
CPC .. B60N 2/2806; B60N 2/2824; B60N 2/2863; B60N 2/2875

USPC ...................... 297/250.1, 253, 256.13, 256.16
See application file for complete search history.

(56) References Cited

U.S. PATENT DOCUMENTS

| | | | | |
|---|---|---|---|---|
| 4,480,870 | A * | 11/1984 | von Wimmersperg ... | 297/216.11 |
| 6,817,665 | B2 * | 11/2004 | Pacella et al. ............ | 297/250.1 |
| 7,097,245 | B2 * | 8/2006 | Barker ..................... | 297/256.14 |
| D535,125 | S * | 1/2007 | Batchelor ................ | D6/708.19 |
| 7,753,445 | B2 * | 7/2010 | Kassai et al. ............. | 297/256.16 |
| 8,366,192 | B2 * | 2/2013 | Clement et al. ........... | 297/253 |
| 8,419,129 | B2 * | 4/2013 | Inoue et al. .............. | 297/256.13 |
| 9,039,083 | B2 * | 5/2015 | Clement .................. | 297/256.13 |
| 2008/0315647 | A1 * | 12/2008 | Carine .................... | 297/250.1 |

* cited by examiner

*Primary Examiner* — Peter Brown

(57) ABSTRACT

The invention refers to a motor vehicle child safety seat comprising a support with means of side anchoring to the vehicle and a telescopic leg for support on the floor of the vehicle, characterized by the fact that the support is made up of a sloping frame, with means for anchoring it and having means to adjust the its length, so that by varying the length of the leg, you can change the slope of the support and thus the tilt of the chair. Thus, it is not necessary that the seat comprises means of conventional articulation to achieve the tilt of the chair.

4 Claims, 2 Drawing Sheets

MOTOR VEHICLE CHILD SAFETY SEAT

OBJECT OF THE INVENTION

More specifically the present invention relates to a motor vehicle child safety seat, which is secured to the means of restraint in the vehicle and that has a support with a foot that rests on the floor of the vehicle.

STATE OF THE ART

There are several types of safety seats for use in a motor vehicle, which habitually use anchoring points that secure to the means of restraint fitted to the vehicle seats.

These safety seats are composed of a horizontal attachment base to which the seat is attached. This attachment base, which rests on the surface of the vehicle seat, incorporates the means to secure the seat to the vehicle, having in addition a support leg on the opposite end to the anchoring points, where the vehicle seat ends, which is used to support the free end of the base to the vehicle floor, with means to adjust the height of this leg.

These seats normally incorporate an articulated system that enables them to be tilted independently from the base.

SUMMARY OF THE INVENTION

This invention refers to a motor vehicle child safety seat, which in addition to enabling it to be secured to the means of restraint of the vehicle, it has means to enable the seat to be tilted without this needing auxiliary or others means of articulation.

To achieve this, the child's seat presented here comprises a support that has the means to be secured to a vehicle and a telescopic leg that supports the assembly on the vehicle floor, this is adjustable so it can be adapted to the distance between the child's seat and the vehicle floor.

It is characteristic for said support to be formed by a sloping frame that creates a space where the seat is fitted, and having in the lower front part (the closest to the back of the vehicle seat it is secured to) means to secure it to the vehicle.

The telescopic support leg is fitted on the rear part of the frame and on a high area, with means to adjust its length, so that on adjusting the length of the support leg that rests on the floor of the vehicle, you can vary the inclination of the support, and thus the tilt child's seat, varying the height of the rear part of the support and pivoting it on the means to anchor it to the vehicle.

A transversal upper piece is fitted to said lower front part that rests on the back of the vehicle seat to increase safety in case of a crash with another vehicle or against an obstacle, among others. A corresponding ergonomic-trim covering is fitted onto this upper transversal piece, and it is supported on a transversal shaft located between both means of anchoring of the seat to the vehicle.

The frame, in its upper rear part has a support for the seat headrest, which is adjustable in height to adapt it better to the user, by means of the corresponding adjustment devices and controls.

In this manner, you have a seat that by means of a sloping frame and the height adjustable support leg, enables the entire assembly to be tilted, thus avoiding the need to install specific tilting systems in the seat.

Other details and features will be described in the description below, referring to the two sheets of drawings that accompany this report, in which a practical application of the invention is presented as a non-exclusive example.

DESCRIPTION OF AN EMBODIMENT OF THE INVENTION

Figure 1:
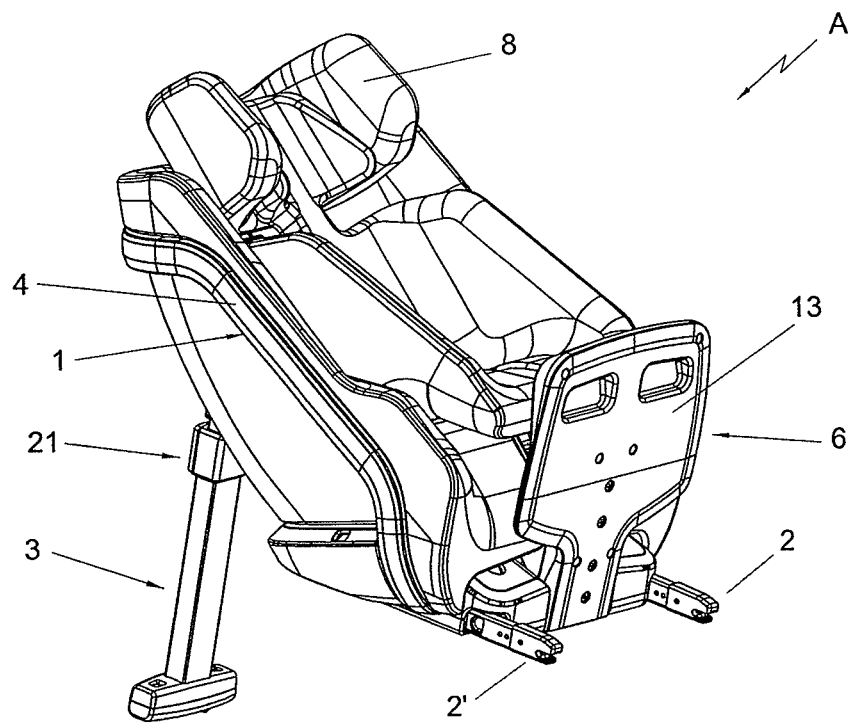
FIG. 1 is a front perspective view of the complete seat with the support.
Figure 2:
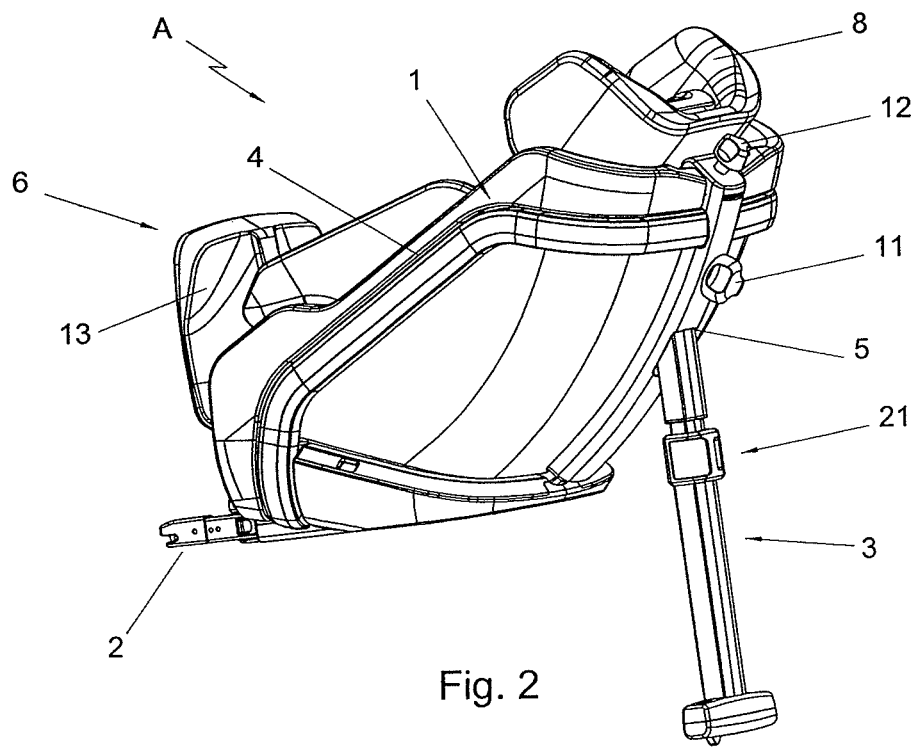
FIG. 2 is a rear perspective view of the complete seat with the support.
Figure 3:
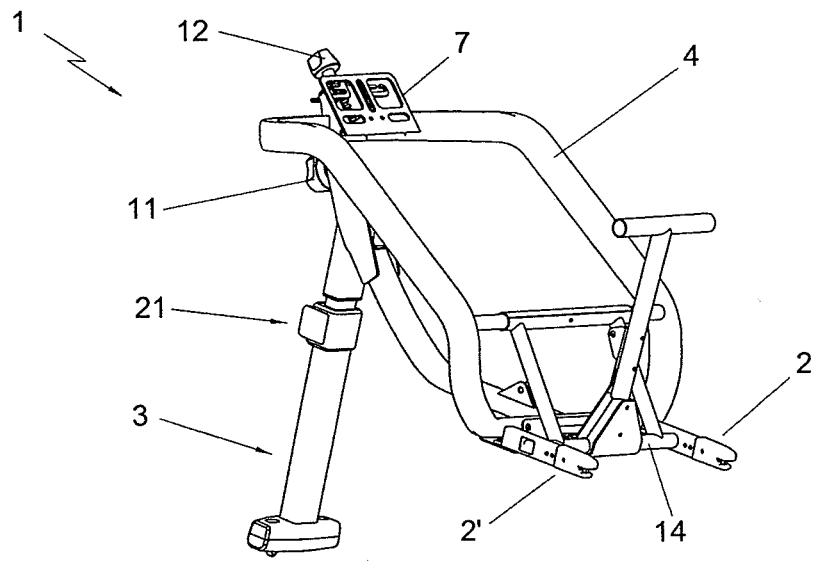
FIG. 3 is a front perspective view of the support.
Figure 4:
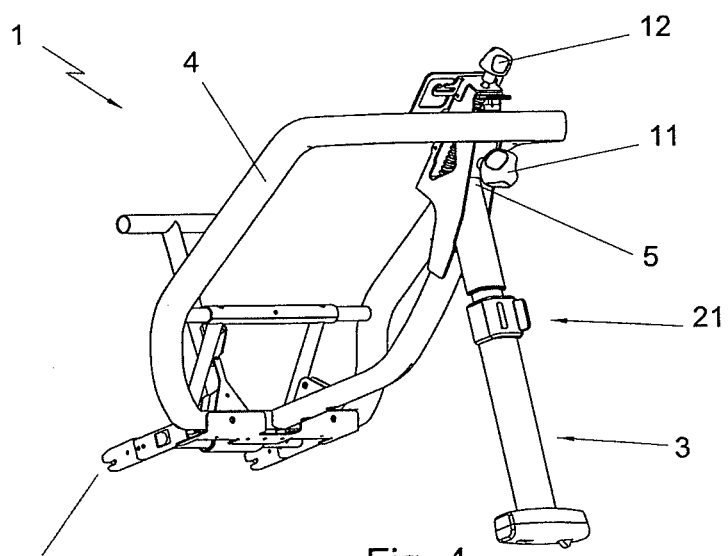
FIG. 4 is a rear perspective view of the support.

In this preferred embodiment of the invention, as can be seen in FIGS. 1 to 4, the child's seat (A) has a support (1) comprising a sloping frame (4) that determines a space where the seat (A) is fitted. The lower front part of the frame (4) is practically resting on the vehicle seat, while its rear part is raised with regard to the seat.

The seat (A) has some ISOFIX type anchoring means (2 and 2') to the vehicle, which (2 and 2') are located on the lower front part of the sloping frame (4), and which are joined by means of a transverse shaft (14).

The upper transversal piece (6) is fitted to the transversal shaft (14) and is designed to rest against the back of the vehicle seat and avoid the rotation of the seat (A) on the anchoring means (2 and 2'), in cases of impact against other vehicles or objects, among others. This piece is composed of an ergonomic plate (13) and trim.

The telescopic leg (3) is fitted to the high area (5) of the rear of the frame (4), enabling the support (1) to rest on the floor of the vehicle, as its length can be adjusted. In addition to these conventional adjusting means (21), which are habitually discontinuous, there are other independent means (9) for adjusting the length of the telescopic leg (3), and that once the first are adjusted to the height of the seat with regard to the floor of the vehicle, they enable, by the use of the corresponding control (11), to carry out contiguous adjustment that will tilt the assembly with regard to the position of the first securing element of the length of the leg, without needing to readjust the conventional devices (21).

Figure 5:
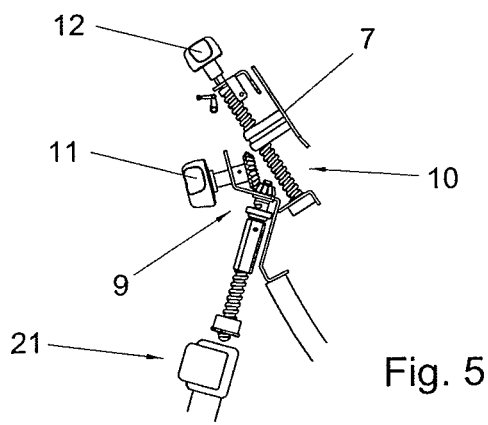
FIG. 5 is a detailed view of the means for adjusting the height of the support leg and the headrest.

This adjustment system (9), as can be seen in FIG. 5, comprises a control (11) that acts on a system of conical gears that move a worm gear that increases or reduces the distance between the position of the control (11) and the conventional adjusting system (21), and therefore the total length of the leg (3), just by moving the worm gear up or down. In this manner the system for adjusting the tilt of the seat (A) is continuous, thus achieving the ideal angle for the baby or child, without having to modify the height from the floor established beforehand by the conventional adjusting system (21) of the leg (3).

Alternatively, the two means for adjusting the leg can be grouped in a single system and control, which thanks to the attachment area of the leg (3) on the high area (5) of the support (1), and the sloping configuration of the frame (4) of said support (1), the whole seat (A) can be tilted with one adjustment device for the length of said leg (3).

On the same rear part of the frame (4) there is a headrest (8) support (7) that will enable, by means of height adjustment (10), to move the headrest by acting on its associated control (12).

This adjustment system (10), as can be seen in FIG. 5, is formed by means of a worm gear system that moves the support (7) attached to the worm gear. In this manner, a continuous adjustment system for the headrest height is achieved, enabling easy adaptation to the baby or child.

Alternatively both the headrest (8) adjustment system (10) and the system for adjusting (9) the length of the leg (3) can be discontinuous adjustment systems, such as for example anchor points of the control, like the conventional adjusting system (21) for the telescopic leg (3).

This embodiment has a seat (A) that has a child's seat fitted onto it. This child's seat has the necessary openings for the passage of the safety straps of the seat (A).

Having sufficiently described this invention, with correspondence to the attached drawings, it is easy to understand that any sort of modification deemed necessary can be introduced as long as they do not change the essence of the invention, which is summarised in the following claims:

The invention claimed is:

1. A motor vehicle child safety seat comprising a support including a sloped frame having a lower front part adapted to engage a seat back of a seat of a vehicle and an upper rear part on which a telescopic leg is mounted for supporting the sloped frame on a floor of the vehicle forward of the seat, wherein the support is mounted to the sloped frame anchors connected to the lower front part for anchoring the sloped frame to the vehicle, the telescopic leg including a first adjustment device for adjusting the length of the leg so a lower end of the leg engages the floor of the vehicle, and a tilting system with an independent and second adjustment device that adjusts a distance between the first and second adjustment devices to thereby adjust a slope of the sloped frame of the support and thus a tilt of the child's seat, without modifying the adjustment of the first adjustment device.

2. The motor vehicle child safety seat according to claim 1, wherein the frame has a support for a headrest of the child's seat on the upper rear part of the sloped frame.

3. The motor vehicle child safety seat according to claim 2, adjustment including another adjustment device for adjusting a position of the support for the headrest.

4. The motor vehicle child safety seat according to claim 3, wherein the first adjustment device for adjusting the length of the leg and the another adjustment device for adjusting the position of the support for the headrest are continuous position adjustment devices.

* * * * *